UNITED STATES PATENT OFFICE.

ALBERT E. GREENE, OF CHICAGO, ILLINOIS.

PROCESS OF MELTING STEEL-SCRAP.

1,185,395. Specification of Letters Patent. Patented May 30, 1916.

No Drawing. Application filed December 18, 1912. Serial No. 737,558.

*To all whom it may concern:*

Be it known that I, ALBERT E. GREENE, citizen of the United States, residing at Chicago, in the county of Cook and State of Illinois, have invented a certain new and useful Improvement in Processes of Melting Steel-Scrap, of which the following is a full, clear, concise, and exact description.

My present invention relates to processes of melting steel and alloys in electric furnaces and more particularly in induction furnaces and provides a means of melting steel scrap with practically no oxidation of the metal or formation of oxid slag, and therefore in an essentially deoxidized condition.

Heretofore in the melting of steel in electric furnaces of the arc, resistance or induction types, it has been found that an oxid slag forms with considerable rapidity both during adding scrap and when heating or melting. As soon as any oxid has formed, it immediately attacks and combines with such elements and oxids for which it has affinity and forms a slag with them either alone or with the aid of more oxygen. Thus it is that in practically every case the silicon and manganese, and such elements as vanadium, tatanium, etc., and the alloy elements in general, are very rapidly oxidized and pass into the slag in the melting of steel scrap containing these valuable alloys. Also when the oxids come in contact with a lining of opposite chemical nature, they flux with it and eat it away rapidly.

My present invention provides a means of melting scrap and preventing the formation of oxid slag, thereby not only saving both the iron and also special alloys contained in the scrap, but also very greatly eliminating wear and corrosion of the lining, and furthermore avoiding the presence of any slag in pouring metal from the furnace.

In one of its embodiments my invention relates to the melting of high grade steel scrap already suitably pure in phosphorus and sulfur.

The primary feature of my invention consists in the use of a reducing gas forced into contact with the metal or forced into the furnace chamber in proximity to the metal during melting, whereby any oxids formed from rust or other source of oxygen will be reduced and any further oxidation of the metal or the alloys therein, which it is desired to retain, prevented.

Another embodiment of my invention relates to a method of operating electric furnaces, particularly of the induction type to minimize wear on, and corrosion of, the lining.

To carry out my process in one of its modifications, I may use an induction furnace and one method of carrying out my process in such a furnace will now be described.

A sufficient amount of molten iron or steel charge is provided in an induction furnace to permit of the furnace taking power. Reducing gas, preferably from a producer, is then forced into the furnace chamber preferably so that it burns from any openings out of the furnace chamber with a small flame. In this way it is possible to make sure that the furnace chamber is full of gas and that no oxidation will occur. For preventing oxidation, it is not essential to have a gas which will burn, since a gas with only a very limited amount of reducing components will prevent oxidation of metallic oxid slag, but it is preferable. With a relatively low per cent. of reducing agent and consequently larger proportion of oxidizing component, such as $CO_2$, there occurs, of course, a fairly rapid decarburization of the metal as a result of the oxidation of the carbon by the $CO_2$. Meanwhile steel scrap, preferably suitably free from phosphorus and sulfur so that it requires no further refining, is charged into the furnace, into the metal already therein forming the basis of the charge. Any rust forming a slag on the surface of the metal is reduced by the action of the gas, and in case the gas is not forced through in sufficient quantity to do this, it is only necessary to increase the amount of gas or the amount of reducing components therein and preferably to direct it against the metal surface on which the slag rests.

The melting of manganese steel scrap is one case where my process may be used to advantage. Heretofore in melting manganese steel scrap in arc furnaces or induction furnaces one of the difficulties met with is excessive wear on the bottom and lining; and another difficulty is the loss of manganese and simultaneous relative increase in proportion of carbon, yielding a product unsuitable for commercial use. Both these difficulties I attribute to oxidation of the metal, especially the manganese, and I have avoided both of these difficulties by my process and without use of a basic slag, and, in fact, without any slag whatever. The effect of a relatively large proportion of $CO_2$ is to prevent increase in the percentage of carbon in the steel and to cause decarburization of metal and lower said percentage.

I do not limit myself to carrying out this process in an induction furnace, but I find that results can be attained in an induction furnace by the use of gas in the melting of steel scrap which heretofore to my knowledge have not been attained and which make it possible to very materially increase the life of the furnace lining and to diminish the wear on the walls. There is practically no corrosion of the walls when the slag is absent.

An additonal feature of my invention consists in the melting of steel scrap, irrespective of its alloy constituents, in either an acid lined or a basic lined vessel. I find that when a reducing gas is used, which will prevent the formation of any oxid slag, that there is practically no tendency of the alloy elements associated with the iron or steel to slag with the lining of the furnace. This feature of my invention makes it possible to melt a charge containing metallic elements of both acid and basic nature in the same vessel—for example, manganese-silicon steel in an acid lined vessel.

The composition of the gas may vary greatly. Where a composition of gas is desired that will reduce the metallic oxids and prevent oxidation of the metal without regard to the decarburizing effect of such gas on the steel, the carbon dioxid may be relatively large in proportion to the reducing component, thus causing, of course, decarburization of the metal. Such composition of gas is particularly well suited to melting of manganese steel and manganese iron alloys where it is desired to prevent increase or to actually decrease the percentage of carbon in the metal. In the melting of low carbon vanadium steel and the like, according to the process of this invention, it is desirable to prevent excessive oxidation of the carbon and consequent decarburizing of the metal, since in such event the content of carbon in the metal becomes so low as to be a hindrance to the melting and handling of the metal. Where it is desired to prevent oxidation of carbon, as well as of the metallic elements, the gaseous compounds of oxygen, such as $CO_2$ or $H_2O$, must either be absent or else their effect must be neutralized or counteracted by having them in small amount, or using a gas containing hydrogen or else a gas containing suitable carbon compound. For example, a gas may contain 10 or 15 per cent. $CO_2$, and yet with sufficient tar vapor or hydrocarbon compounds, it may entirely prevent decarbonizing of the metal, and, even recarburize it. By use of fuel high in volatile carbon compounds in proper proportion to other fuel, such as coke, it is possible to control the gas composition at will and the oxidation of carbon may be prevented in the above manner. Hydrogen in the gas is especially serviceable in keeping the metal composition very constant. An acid steel or metal may be retained in a basic lined vessel without essential combination of the acid elements in the steel with the basic elements in the lining. I attribute this to the fact that the reactions involved in slagging an acid element like silicon require generally the combined influence of oxygen to oxidize the silicon and also the influence of the other radical or oxid to form the slag. Thus, if silicon cannot get enough oxygen to form some class of silicate with a basic oxid, it will have almost no effect on the basic oxid. If the furnace lining is made of a basic oxid, corrosive action on it, due to the silicon, may be practically prevented if oxygen is prevented from combining with the silicon.

My present process differs from other electric furnace processes in that the preliminary formation of an oxidizing slag with the attendant solution of some of the oxids in the metal is entirely avoided. In this way the absorption of gas is reduced to a minimum, and it is found that metal obtained by this process is exceedingly fine-grained and deoxidized. Furthermore, the saving in alloys which are originally present in the charge is an item of considerable importance, particularly in the remelting of such steels as silicon steel, vanadium steel, and the like.

The absence of slag is a great advantage in pouring metal directly from the furnace into molds.

The term scrap as applied to steel is understood to mean any material suitable for remelting to make steel.

My process is also particularly applicable to the melting of ferro metals such as ferromanganese. By the use of this process for melting ferro-manganese in an induction furnace, the oxid slag which forms in the absence of a reducing gas is avoided and the corrosive action of such oxid on the lining of the furnace is thereby eliminated. In this way it is possible to use a very much cheaper lining not only for melting ferro alloys, but also for the melting of steel scrap, since the greater part of the cost of maintaining furnace linings is due to the wear which results from corrosive slags.

The terms "slag forming additions" and "slag forming agents" as used in the specification and claims are understood to mean such agents as lime which are commonly added to form slag and which are not to be reduced into the metal, and these terms do not include scale or such oxids of the metals as enter with the scrap and are reduced during the melting process.

What I claim is:

1. The process of melting alloys, which consists in heating the alloy, without the use of a slag, in an electric furnace, while maintaining in the furnace both a reducing atmosphere and non-carburizing conditions with respect to the alloy.

2. The process of melting steel scrap, which consists in melting the scrap, without the use of a slag, in an electric furnace, while maintaining in the furnace both a reducing atmosphere and non-carburizing conditions with respect to the molten product.

3. The method of electric furnace operation for the melting and heating of metals, which consists in melting said metal, without the use of a slag, and maintaining in the furnace a reducing atmosphere which prevents the formation of oxids of the metal, thereby preventing the formation of slag compounds of metallic oxids with the lining material of the furnace.

4. In the melting of steel scrap in an electric furnace, the method of minimizing the power consumption, which consists in avoiding use of slag-forming agents which would require to be heated and melted, meanwhile during melting reducing any oxids entering as scale with the steel by keeping a continually freshened reducing atmosphere above the metal surface in the furnace chamber, and thus at all times maintaining deoxidizing conditions.

5. The method of melting steel containing manganese and saving the manganese therein from oxidation, which consists in charging the manganese-containing steel into a suitable furnace chamber, melting it there with electric heat, avoiding the entrance of slag-forming fluxes into the furnace with the steel, and meanwhile, during melting, maintaining the atmosphere in the chamber above the metal surface continually reducing toward oxids of the metal and maintaining in the gas a considerable proportion of carbon dioxid.

6. The method of melting steel containing an alloying metal of an acid and of a basic nature, respectively, which consists in heating the steel without addition of slag-forming flux in an electric furnace, and preventing the slagging of the alloying metals therein with the furnace lining by passing a reducing gas through the furnace during the melting operation, and thereby continually maintaining above the metal surface in the furnace a reducing atmosphere toward oxids of the alloying metals.

7. The method of melting steel scrap containing silicon and manganese to save those metals in the melted steel, said method consisting in charging said steel scrap containing these alloying metals into an electric furnace without entrance of slag-forming fluxes, and, while melting the metal therein, maintaining the atmosphere in the furnace chamber above the surface of the metal continually reducing toward the metals being melted.

8. The process of melting manganese steel scrap and preventing loss of manganese by oxidation without the use of a slag, which consists in providing a bath of steel in an electric furnace, melting the manganese-containing steel thereinto without slag forming-additions, maintaining a reducing atmosphere in the furnace, and continually passing a current of reducing gas having reducing properties for manganese oxid through the furnace during the melting operation.

9. In the melting of manganese iron alloys to save the manganese from oxidation, the process which consists in charging the scrap into an electrically heated chamber without slag-forming additions, maintaining a reducing atmosphere in contact with the metal in the furnace, and passing a reducing gas continually through the furnace.

10. In the melting of manganese iron alloys to save the manganese and control the carbon content thereof, the process which consists in melting the alloy in an electric furnace in the absence of slag-forming additions in an atmosphere reducing toward oxid of manganese, and, during the melting operation, passing through the furnace a current of gas which is reducing toward the metallic oxids and oxidizing toward the carbon of the charge.

11. In the melting of manganese steel scrap, the process which consists in providing a bath of molten steel in an electric furnace free from slag-forming agents, and, while supplying the heat electrically and maintaining a reducing atmosphere, charging the manganese-containing steel scrap and melting the same while passing through the furnace a current of gas having reducing properties toward oxids of iron or manganese present and decarburizing properties toward the metal.

12. In the melting of manganese steel scrap in an electric furnace, the process which consists in causing the scale entering with the scrap to react with the carbon therein under the influence of electric heat and a reducing atmosphere, avoiding slag-forming additions, and passing a current of reducing gas through the furnace during the process, said gas having reducing action on the oxids present in the scale, causing the reduction of these metallic oxids and the deoxidation of the steel.

13. In the melting of manganese steel scrap containing silicon to save the manganese and silicon therein, the process which consists in melting said scrap in a basic lined electric furnace in a reducing atmosphere without slag-forming additions, and, meanwhile, passing through the furnace a gas which has reducing action on any oxids of the metals present.

In witness whereof, I hereunto subscribe my name this sixteenth day of December, A. D., 1912.

ALBERT E. GREENE.

Witnesses:
McCLELLAN YOUNG,
GEORGE E. FOLK.